MAGNETIC BIDIRECTIONAL SYSTEM

Filed April 21, 1958 3 Sheets-Sheet 1

SEYMOUR MARKOWITZ
BEN T. GODA
INVENTORS

BY Lyon & Lyon

ATTORNEYS

Jan. 5, 1960 S. MARKOWITZ ET AL 2,920,315

MAGNETIC BIDIRECTIONAL SYSTEM

Filed April 21, 1958 3 Sheets-Sheet 2

SEYMOUR MARKOWITZ
BEN T. GODA
INVENTORS

BY Lyon & Lyon

ATTORNEYS

Jan. 5, 1960 S. MARKOWITZ ET AL 2,920,315

MAGNETIC BIDIRECTIONAL SYSTEM

Filed April 21, 1958 3 Sheets-Sheet 3

SEYMOUR MARKOWITZ
BEN T. GODA
INVENTORS

BY Lyon & Lyon

ATTORNEYS

United States Patent Office 2,920,315

Patented Jan. 5, 1960

2,920,315

MAGNETIC BIDIRECTIONAL SYSTEM

Seymour Markowitz, Los Angeles, and Ben T. Goda, Gardena, Calif., assignors to Telemeter Magnetics, Inc., Los Angeles, Calif., a corporation of New York Application April 21, 1958, Serial No. 729,665

7 Claims. (Cl. 340—174)

This invention relates to magnetic memory systems and, more particularly, to an improvement in magnetic-core memory systems.

A magnetic-core memory is a data storage device, such as a magnetic drum or magnetic tape, in which each magnetic core can store either a one or a zero. To store a one, the core is driven to saturation at one polarity; to store a zero, the core is driven to saturation at the opposite polarity. The usual arrangement for the coincident-current magnetic-core storage system is one wherein the cores are arranged in rows and columns to form a memory core plane. A word of data, consisting of a number of bits, may be stored in a plurality of cores in one plane or in a single core in each of a plurality of planes.

Usually, in a plane of cores, there is provided, for each row, a row coil, coupled to every core in a row. For each column of cores there is provided a separate column coil, coupled to each core in a column. In some instances a reading winding is provided which is coupled to every core in the memory core plane if these are read singly. In other instances a plurality of reading windings are provided which are coupled to groups of cores, wherein one core in each group is read at each readout operation. The arrangement described is one which employs coincident current for selecting a core in a plane for the purpose of reading or writing. The row coil and column coil are excited so that only a core which is coupled to both the excited coils receives the sum of their excitation. The other cores coupled to these excited row and column coils receive only half the total excitation applied to the core plane, and thus are not affected.

It will be appreciated that in order to drive a selected core to saturation at one magnetic polarity, current is made to flow through the coils in one direction. In order to reverse the magnetic polarity saturation of the selected core, the currents through the row and column coil coupled to that core must be reversed. This is usually performed by using two current drivers per coil for changing the direction of current, or by using extra sets of coils. These arrangements are costly, either in material or manufacture.

An object of the present invention is to provide an inexpensive arrangement for driving a coincident-current magnetic-core storage system.

Another object of the present invention is the provision of a novel and useful driving arrangement for a coincident-current magnetic-core storage system.

Still another object of the present invention is the provision of a coincident-current magnetic-core storage system drive which employs a minimum of associated driving equipment.

These and other objects of the present invention are achieved by dividing the number of rows of cores in a memory plane into a plurality of groups of rows with the same number of rows of cores in each group. Alternatively expressed, if the number of rows of cores is equal to Y, then Y will equal the product of two integers M and N, where M and N may or may not be equal. M equals the number of groups of rows in a core plane, and N equals the number of rows in each group. A current driver is provided for each group of rows. A number of current steerers are provided equal to the number of rows of cores in a group. Each row coil is coupled with one polarity to all the cores in a row in one group and with the opposite polarity to all the cores in a corresponding row in another group. One end of the row coils which are associated with one group of rows is connected to one of the current drivers; the other ends of these row coils, after they have been coupled to the respective rows of cores in another group, are respectively coupled to a different one of the current steerers.

To select and drive a core to the one state, the column coil which is coupled to that core is driven with half the required excitation. The current driver connected to the row coils in which group the desired core is positioned is excited, and, also, the current steerer which is connected to the other end of the row coil coupled to the desired core is excited. The selected core will then have the required excitation. Another core in the same column will also be excited by this row-coil drive; however, it will be opposite to the excitation of the column coil, and thus is canceled.

For the purpose of readout of the information stored in the rows of cores, a common readout coil is employed and is designated as the Z-coil. This Z-coil is coupled to all the cores in the memory. For readout, the Z-coil is excited with half the excitation required to drive a memory core, and the polarity of this excitation is in a direction to restore the cores to their zero state. Then the current driver, which drives a first group of row coils, is excited. Thereafter, the current steerers may be excited randomly or, if desired, in sequence. This results in all the cores in a row being reset and emitting the data stored therein. The rows are successively reset in a group as the current steerers are successively excited. When the data in the group has been read out, then the next current driver to a next group of rows of cores is excited, and the current steerers are successively excited again. This may be continued until the data in the memory has been completely read out.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
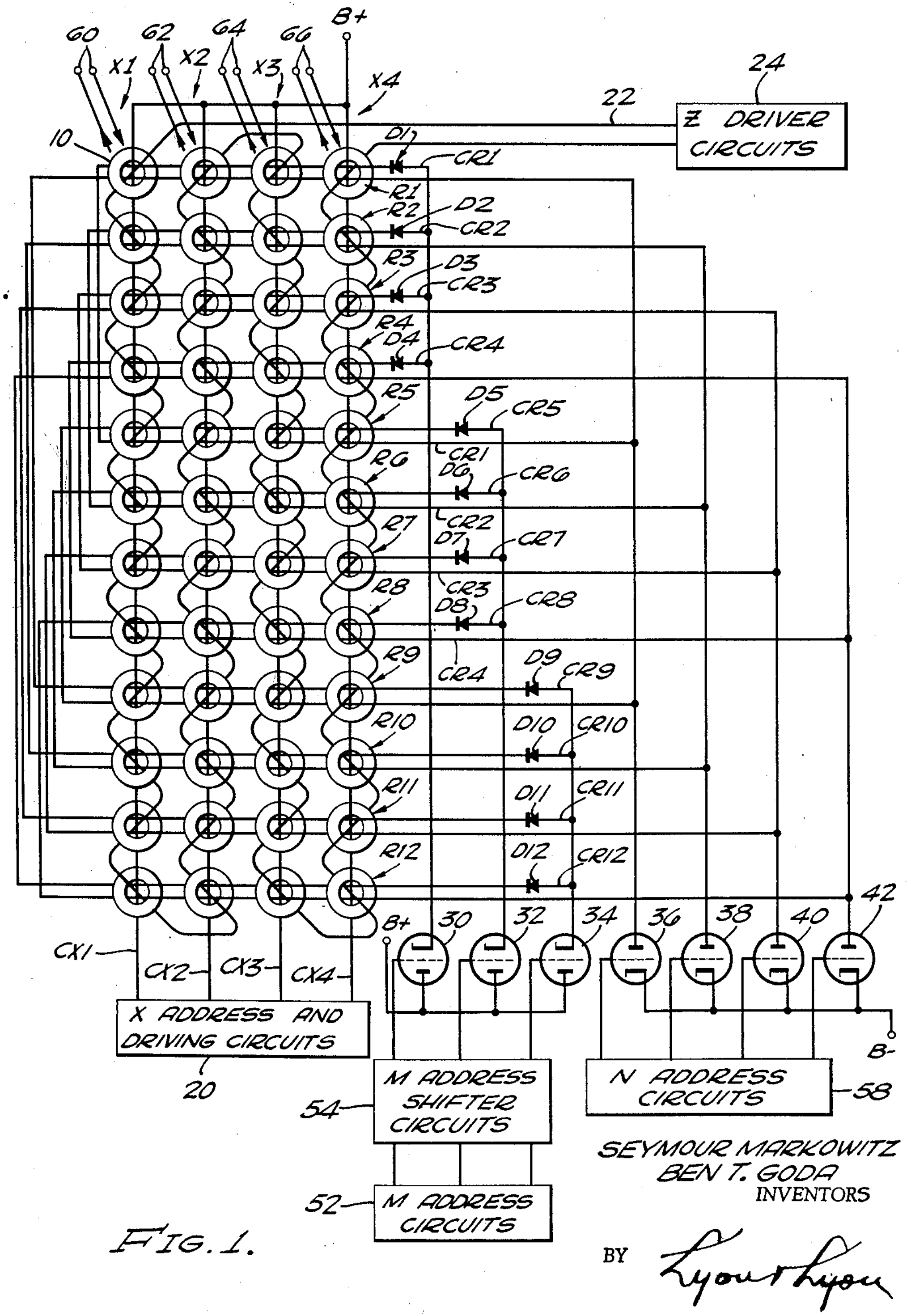
Figure 1 is a circuit diagram of one embodiment of the invention.

Reference is now made to Figure 1, which is a circuit diagram of an embodiment of the invention. This will include a plurality of toroidal storage cores 10 of a type suitable for use in a magnetic-core memory. Each core has substantially rectangular hysteresis characteristics and is capable of being driven from saturation having one magnetic polarity, which for convenience in description will be considered as the "one" state, to saturation at the opposite magnetic polarity, which will be considered as the "zero" state. In order to be driven from one to the other state, it is required that two current pulses should be coincident at a selected core, with the sum of the currents providing a sufficient magnetomotive drive to change the state of the core. If less than the required amount of current is applied to a core, then its state is not altered.

By way of illustration of the principles of this invention, and not to serve as a limitation, a magnetic-core matrix memory is shown which has 12 rows and 4 colums. It will be appreciated that more rows and columns of cores may be employed, if desired. The columns of cores will be designated as X1, X2, X3, and X4. The rows of cores will be designated as R1 through R12. There is a separate column coil CX1, CX2, CX3, CX4 coupled to the respective columns of cores X1, X2, X3, X4. These may be selectively excited by the application of current from well-known driving circuits which are here designated as X-address-and-driving circuits 20. The excitation to these column coils is unidirectional, is less than the required amount of excitation to drive a core from saturation at one polarity to the opposite polarity, preferably half the required amount. A second coil 22, which may be referred to as the Z-coil, is coupled to all the cores in the memory. This is driven by a current source, designated as the Z-driver circuits 24, and, when excited, applies unidirectional current, which provides at each core a magnetomotive force which is equal to that applied to column or row coils, but in a direction which tends to restore the cores to their initial, or zero, condition.

In accordance with the principles of this invention, the rows of cores totaling Y are divided into M groups of rows, each group having the same number of rows N. Thus, there are M groups with N rows in each group, and the total number, Y, will equal $M \times N$. A maximum economy in apparatus is achieved when $M=N$. In the embodiment of the invention illustrated in Figure 1, $M=3$ and $N=4$. One current driver tube 30, 32, 34 is provided for each row group. One current steerer tube, 36, 38, 40, 42 is provided for each row of cores in a group.

Each one of the current drivers 30, 32, 34 is connected to one end of all the row coils in a group. Thus, assuming group 1 will include rows R1, R2, R3, and R4, current driver 30 is connected to row coils CR1, CR2, CR3, and CR4. Each row coil will have one of the diodes D1 through D12 connected therein, to insure current flow only through a selected row coil. Row coil CR1 is coupled to all the cores in row R1 with one polarity, and then is looped around to be coupled to all the cores in row R5 with an opposite polarity. The other end of row coil CR1 is then connected to current steerer 36. Row coil CR2 is connected with one polarity to all the cores in row R2 and then is looped around to be coupled with the opposite polarity to all the cores in row R6. It is then connected to current steerer 38. Row coil CR3 is first coupled to all the cores in row R3 in one polarity, then to all the cores in row R7 in opposite polarity. Row coil CR4 is coupled to all the cores of row R4 in one polarity and then is looped around to be coupled to all the cores of row R8 in an opposite polarity. The other ends of row coils CR7 and CR8 are respectively connected to the current steerers 40, 42. From the above, it may be deduced that a row coil is first coupled to all the cores in one row with one polarity and then is looped around to be coupled to a row of cores, displaced N rows away in an opposite polarity.

Considering all the row coils in the second group, respectively CR5, CR6, CR7, and CR8, it will be seen that these have one end connected to the current driver 32, then are coupled to the respective rows of cores R5, R6, R7, R8 in one polarity, then are looped around to be coupled to the cores in the rows R9, R10, R11, R12 in an opposite polarity, and then are respectively connected to the current steerers 36, 38, 40, 42. Considering the row coils CR9, CR10, CR11, and CR12, these are all connected at one end to current driver 34, thereafter have one portion respectively connected to the cores in the rows R9, R10, R11, and R12 with one polarity, are looped around and have a second portion respectively coupled to the rows of cores R1, R2, R3, and R4 in an opposite polarity, and then are respectively connected to current steerers 36, 38, 40, and 42.

Figure 2:
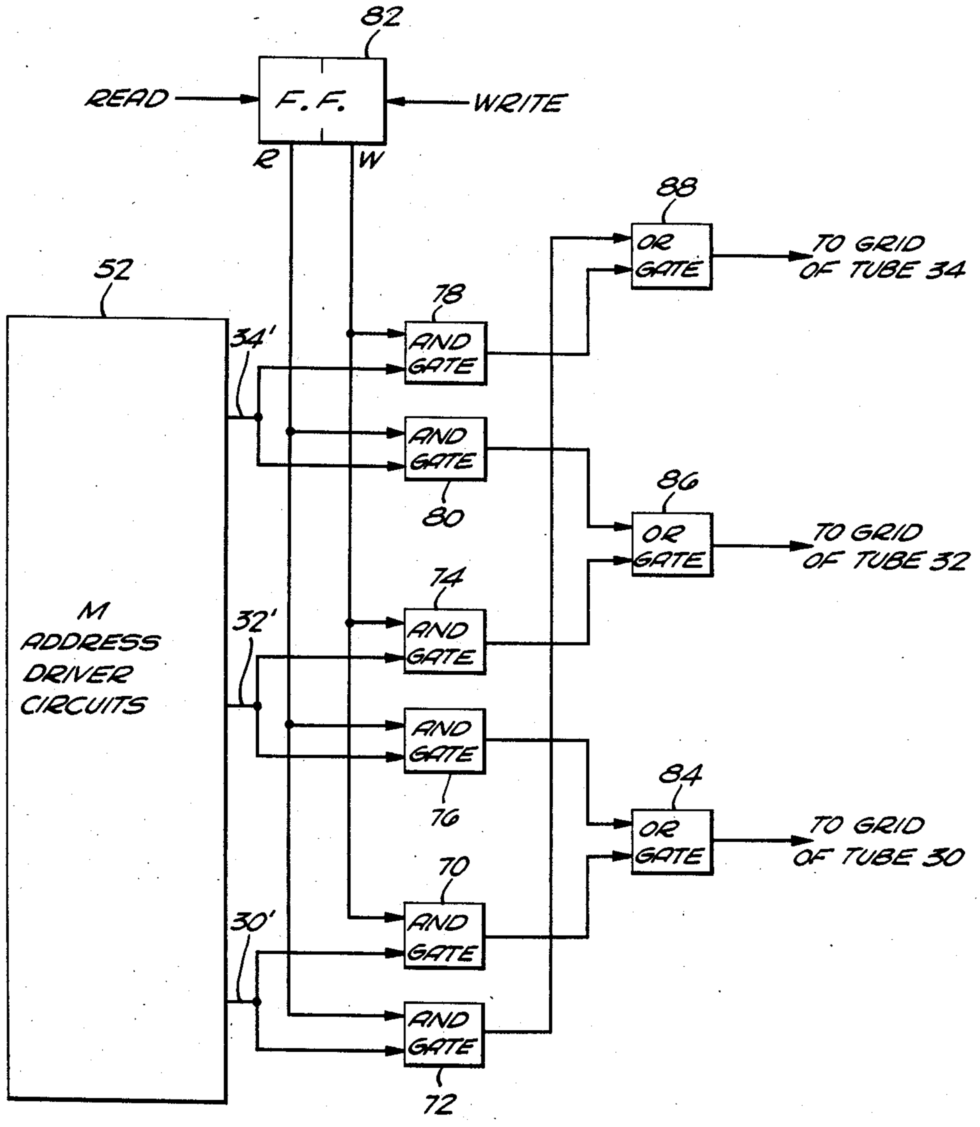
Figure 2 is a block diagram of an address shifter which is employed in the embodiment of the invention.

For the purpose of writing information into a selected core, a column coil coupled to that selected core is excited, and a row coil coupled to that selected core is excited. For example, if it is desired to write into the core which is at the junction of column 4 and row 1 and is located by X4—R1, then the X-address-and-driving circuits 20 are employed to apply half the required excitation to column coil CX4. M-address circuits 52 are employed to excite the current driver 30 through an M-address shifter circuit 54. The details of this latter circuit are shown in Figure 2. The current steerer 36, which is connected to the other end of the coil passing through the selected core, is then also excited by means of the N-address circuits 58. For the core X4—R1, this requires an excitation of current absorber 36. It will therefore be seen that half-excitation is applied from coil CX4 and another half-excitation is applied from coil CR1 to the selected core X4—R1. Row coil CR1 and column coil CX4 are also coupled to a core located as X4—R5, which is four rows away from core X4—R1. However, in view of the reversed coupling of coil CR1 to this core, it is not moved from whatever state it has prior to such excitation.

It should be apparent from the above description that any one of the cores in the matrix may be selected and written into by selecting and exciting the column coil coupled to that core and energizing a current driver which is coupled to the cores in the group, including the desired core, and energizing a current steerer which is coupled to the other end of the row coil, which is coupled to the desired core. The arrangement shown in Figure 1 is suitable for storing four-bit words, with each word being stored in a different row. Entry of the word into a row is made by exciting a current driver which is coupled to all the coils in the group, including the desired row, and a current steerer coupled to the other end of the row coil passing through the desired row. The column coils may then be selectively excited in accordance with the ones and zeroes in the four-bit word.

Readout from the rows is performed by exciting the Z-coil from the Z-driver circuit 24, with a current which produces an excitation at each core substantially equal to that applied previously by a column coil, but in an opposite sense. In other words, the Z-coil receives half the required turnover excitation in a zero driving direction. Thereafter, the M-address circuits 52 and the N-address circuits 58 are set up to excite the same current driver and steerer as would be excited for the process of writing. However, for reading, the M-address-shifter unit 54 shifts the driver address by one. As a result, a reverse current is applied to the row of cores from which a readout is desired, enabling such readout to occur.

The amplitude of the Z-drive current is half the required amount. The row-coil drive is half the required amount. Thus, the row-coil current adds to the effects of the Z-coil current in a selected row, and the cores in the selected row in a "one" state are driven back to their "zero" states. A reading coil 60, 62, 64, 66 is provided for each column of cores. In order to avoid confusion in the drawing, only the input terminals of the respective reading coils are shown. It will be understood that these are coupled as is well known to each one of the cores in the respective columns. Those reading coils coupled to cores which are driven from the "one" to the "zero" state will have an output current. The other reading coils will not have any current.

In order to further illustrate the operation just described, assume that it is desired to read previously written data from row R4. First, the Z-coil is excited. Thereafter, the M and N-address circuits are set up to select, respectively, current driver 30 and current steerer 42. However, the M-address-shifter circuit 54 is made operative when the reading process is to take place, and it acts to shift the current driver to be excited backwards one step. As a result, current driver 34 is excited, instead of current driver 30. Since the only current steerer which has been made operative is 42, then current flows through row coil CR12. The current through the portion of the row coil CR12 in row 12 tends to drive the cores in row 12 to their "one" state. This is opposed by the Z-coil current effects and these cores are unaffected. However, now the current flowing through the other half of the row coil CR12 passes through row R4 with a polarity to assist the current in the Z-coil, instead of opposing it. As a result, all the cores in the row R4 are driven to their zero, or reset, state, whereby the information which these cores contain will appear as signals in the respective reading coils 60, 62, 64, 66.

Reference is now made to Figure 2 of the drawing, which shows a block diagram of the arrangement for the M-address-shifter circuit 54. This will comprise a flip-flop circuit AND gate and OR gates, all of which are circuitry which are well known in the field of electronic information-handling systems in which this invention falls. The M-address driver circuits 52 have their respective outputs each connected to two AND gates. For example, the output 30', intended for current driver tube 30, is applied to AND gates 70 and 72. The output 32', intended for current driver tube 32, is applied to AND gates 74 and 76. The output 34', intended for current driver tube 34, is applied to AND gates 78 and 80. A flip-flop circuit 82 supplies the priming inputs to the respective AND gates, which enable them to provide an output whenever their other inputs 30', 32', 34' are enabled. Thus, the flip-flop circuit 82 has two outputs, respectively designated as "R" for read and "W" for write. The R output is connected to AND gates 80, 76, and 72; and the W output is connected to AND gates 78, 74, and 70. The flip-flop circuit 82 has two stable states. It is driven to the stable state whereby its R output is enabled to prime the AND gate to which it is connected when a pulse is applied to the read side. It is driven to its other stable state when its W output can prime AND gates to which it is connected when a pulse is applied to its write side.

An OR gate 84 is connected to receive the outputs from AND gates 70 and 26, an OR gate 86 is connected to receive the outputs from AND gates 74 and 80; and an OR gate 88 is connected to receive the outputs from AND gates 72 and 78. OR gate 84 will apply an output to current driver 30 when either of its inputs is excited. OR gate 86 will provide an output to current driver 32 when either of its inputs are excited. OR gate 88 will supply an output to the current driver 34 when it is excited from either of its inputs. In operation, during the writing phase of operation of the memory shown in Figure 1, a pulse is applied to the write side of flip-flop 82, to drive it to the stable condition wherein its W output is energized. Thereby, an exciting signal, which is applied to the input leads 30', 32', and 34', will be applied directly to the current drivers 30, 32, and 34.

In the read phase of operation, first a pulse is applied to the flip-flop 82, to drive it to the stable condition with its R output energized. Thereby, should an energizing signal be applied to the input lead 30', AND gate 72 will thereafter excite OR gate 88, and the current driver 34 is energized. Input applied to lead 32' will pass through AND gate 76 and OR gate 84 to the grid of tube 30, instead of through AND gate 74 and OR gate 86 to the grid of tube 32. Similarly, should lead 34' be energized, instead of passing through AND gate 78 and OR gate 88 to energize current driver 34, excitation will pass through AND gate 80 and OR gate 86 to the grid of current driver 32.

Figure 3:
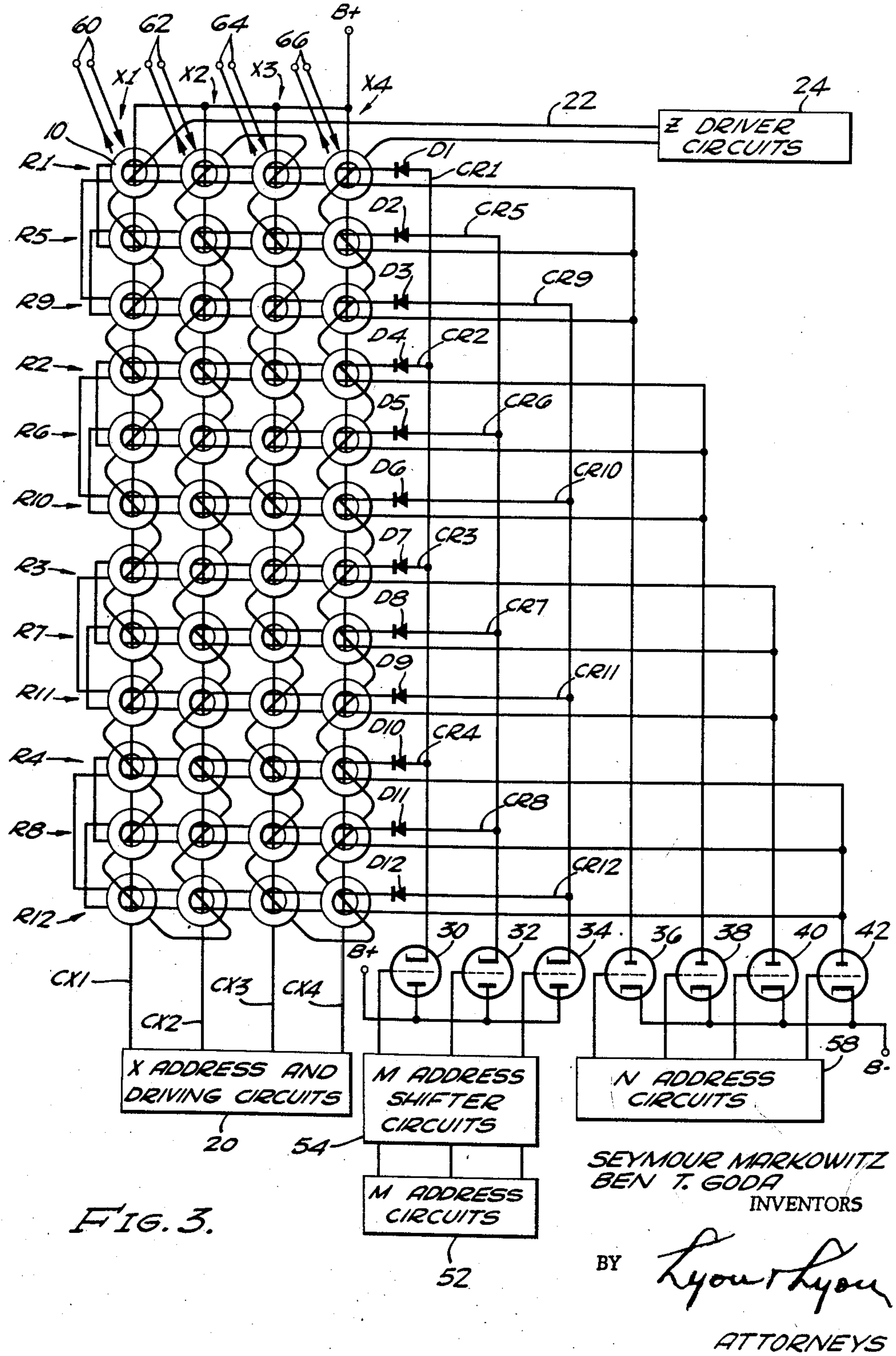
Figure 3 is a circuit diagram of a second embodiment of the invention.

Figure 3 is a circuit diagram of another embodiment of the invention. This is substantially identical with the embodiment of the invention shown in Figure 1, and the same reference numerals as are used in Figure 1 are applied to the same apparatus in Figure 3, except that instead of the rows of cores in a group being contiguous to one another, they are spaced from one another by M rows. As a result of this, the adjacent rows of cores belong to different groups. The other ends of three adjacent row coils are then coupled to a different one of the current steerers. The principles for the row-coil interconnections which were described in connection with Figure 1 thus remain the same in Figure 3. However, with the arrangement in Figure 3, whereby the row groups are not made up of adjacent rows of cores, the multitude of overlapping wires on the left side of the core matrix shown in Figure 1 is eliminated. Where the physical order of the various row-coil portions which overlap is of no significance, then the construction shown in Figure 1 may be employed.

The operation of the arrangement shown in Figure 3 is identical with the operation described for the diagram shown in Figure 1. For writing into a core, excitation is applied to the column coil and to the current driving the group of row coils, including the one passing through the desired core. The current steerer, which is coupled to thte other end of the row-coil passing through the deisred core is also excited. For reading, the Z-coil has one-half the required excitation applied thereto to drive all the cores to their zero state; the M-address shifter is set and conditioned to shift the M-address information back by one step; and the N, or current steerer, address is the same as the one employed foı writing into any core in the row selected for readout.

There has accordingly been described and shown herein a novel, useful, and simple arrangement for controlling the reading and writing of data into and out of a core memory. The address circuits are well-known arrangements of flip-flops or counters which, by their set and reset states, can provide the required energizing output to the current drivers and steerers.

We claim:

1. A drive system for a coincident current driven magnetic core memory system of the type wherein a plurality of cores are arranged in a plurality of columns and rows, said system comprising a plurality of column coils, a different one of which is coupled to all the cores in a different one of said columns, a plurality of current drivers, a plurality of current steerers, the product of the number of current drivers and the number of current steerers equaling the total number of rows of cores, said rows of cores being divided into row groups with as many rows in a group as there are current steerers, a plurality of row coils, each one of said row coils comprising a serially connected first and second section, each of said row coils having its first section coupled in one sense to all the cores in a row in one row group and its second section coupled in an opposite sense to all the cores in one row in a different row group, for each row group means for coupling the first section ends of all the row coils to one of said current drivers, and means for coupling different second section ends of row coils in said row group to a different one of said current steerers.

2. A drive system for a coincident current driven magnetic core memory system of the type wherein a plurality of cores are arranged in a plurality of columns and rows, said system comprising a plurality of column coils, a different one of which is coupled to all the cores in a different one of said columns, a plane coil coupled with one sense to all said plurality of cores, a plurality of current drivers, a plurality of current steerers, the product of the number of current drivers and the number of current steerers equaling the total number of rows of cores, said rows of cores being divided into row groups with as many rows in a group as there are current steerers, a plurality of row coils, each one of said row coils having a serially interconnected first and second section, each of said row coils having its first section coupled in one sense to all the cores in a row in one row group and its second section coupled in an opposite sense to all the cores in one row in a different row group, for each row group means for coupling the first section ends of all the row coils to one of said current drivers, and means for coupling different second section ends of row coils in said row group to a different one of said current steerers.

3. A drive system for a coincident current driven magnetic core memory system of the type wherein a plurality of cores are arranged in a plurality of columns and rows, said system comprising a plurality of column coils, a different one of which is coupled to all the cores in a different one of said columns, a plane coil coupled with one sense to all said plurality of cores, a plurality of current drivers, a plurality of current steerers, the product of the number of current drivers and the number of current steerers equaling the total number of rows of cores, said rows of cores being divided into row groups with as many rows in a group as there are current steerers, a plurality of row coils, each one of said row coils having a serially interconnected first and second section, each one of said row coils having its first section coupled in one sense to all the cores in a row in one row group and its second section coupled in an opposite sense to all the cores in one row in a different row group, for each row group means for coupling the first section ends of all the row coils to one of said current drivers, means for coupling different second section ends of row coils in said row group to a different one of said current steerers and a plurality of reading coils a different one of which is coupled to all the cores in a different column.

4. A drive system for a coincident current driven magnetic core memory system of the type wherein a plurality of cores are arranged in a plurality of columns and rows, said system comprising a plurality of column coils, a different one of which is coupled to all the cores in a different one of said columns, a plane coil coupled with one sense to all said plurality of cores, a plurality of current drivers, a plurality of current steerers, the product of the number of current drivers and the number of current steerers equaling the total number of rows of cores, said rows of cores being divided into row groups with as many rows in a group as there are current steerers, a plurality of row coils, each one of said row coils having a serially interconnected first and second section, each of said row coils having its first section coupled in one sense to all the cores in a row in one row group and its second section coupled in an opposite sense to all the cores in one row in a different row group, for each row group means for coupling the first section ends of all the row coils to one of said current drivers, means for coupling different second section ends of row coils in said row group to a different one of said current steerers, means for selectively exciting a column coil coupled to a core in which it is desired to write, means for selectively enabling a current driver coupled to the row group which includes said core and means for selectively enabling a current steerer coupled to the second section of the row coil which has its first section coupled to said core.

5. A drive system for a coincident current driven magnetic core memory system of the type wherein a plurality of cores are arranged in a plurality of columns and rows, said system comprising a plurality of column coils, a different one of which is coupled to all the cores in a different one of said columns, a plane coil coupled with one sense to all said plurality of cores, a plurality of current drivers, a plurality of current steerers, the product of the number of current drivers and the number of current steerers equaling the total number of rows of cores, said rows of cores being divided into row groups with as many rows in a group as there are current steerers, a plurality of row coils, each one of said row coils having a serially interconnected first and second section, each of said row coils having its first section coupled in one sense to all the cores in a row in one row group and its second section coupled in an opposite sense to all the cores in one row in a different row group, for each row group means for coupling the first section ends of all the row coils to one of said current drivers, means for coupling different second section ends of row coils in said row group to a different one of said current steerers, a plurality of reading coils a different one of which is coupled to all the cores in a different column, means for selectively enabling a current steerer coupled to a row coil second section which is coupled to a row of cores from which it is desired to read, means for selectively enabling a current driver coupled to the first section which is in turn coupled to the second section of the row coils coupled to said rows of cores, and means for exciting said plane coil.

6. In a coincident current driven magnetic core memory system of the type wherein a plurality of cores are arranged in columns and rows and wherein for each column there is a separate column coil coupled to all the cores in the column the improved drive system comprising a plurality of current drivers, a plurality of current steerers, the product of the number of current drivers and current steerers equaling the total number of rows of cores, said rows of cores being divided into row groups with as many rows in a group as there are current steerers, a plurality of row coils, each one of said row coils having a serially interconnected first and second section, each said row coil having its first section coupled in one sense to all the cores in a row in one group and its second section coupled in an opposite sense to all the cores in one row in a different row group, for each row group means for coupling the first section ends of all the row coils to one of said current drivers, and means for coupling different second section ends of row coils in said row group to a different one of said current steerers.

7. In a coincident current driven magnetic core memory system of the type wherein a plurality of cores are arranged in columns and rows and wherein for each column there is a separate column coil coupled to all the cores in the column the improved drive system comprising a plurality of current drivers, a plurality of current steerers, the product of the number of current drivers and current steerers equaling the total number of rows of cores, said rows of cores being divided into row groups with as many rows in a group as there are current steerers, a plurality of row coils, each one of said row coils having a serially connected first and second section, each said row coil having its first section coupled in one sense to all the cores in a row in one group and its second section coupled in an opposite sense to all the cores in one row in a different row group, for each row group means for coupling the first section ends of all the row coils to one of said current drivers, means for coupling different second section ends of row coils in said row group to a different one of said current steerers, a plane coil coupled to all said plurality of cores with one sense, and a plurality of reading coils, a different one of which is coupled to all the cores in a different one of said columns.

No references cited.